US012769292B2

(12) United States Patent
Brand

(10) Patent No.: US 12,769,292 B2
(45) Date of Patent: Oct. 20, 2026

(54) PRODUCTION INSTALLATION AND METHOD FOR OPERATING A PRODUCTION MACHINE

(71) Applicant: Schaeffler Technologies AG & Co. KG, Herzogenaurach (DE)

(72) Inventor: Stefan Brand, Herzogenaurach (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 337 days.

(21) Appl. No.: 18/569,179

(22) PCT Filed: May 5, 2022

(86) PCT No.: PCT/DE2022/100345
§ 371 (c)(1),
(2) Date: Dec. 11, 2023

(87) PCT Pub. No.: WO2023/280336
PCT Pub. Date: Jan. 12, 2023

(65) Prior Publication Data

US 2024/0272627 A1 Aug. 15, 2024

(30) Foreign Application Priority Data

Jul. 5, 2021 (DE) ..................... 10 2021 117 244.6

(51) Int. Cl.
*G05B 19/418* (2006.01)

(52) U.S. Cl.
CPC .................. *G05B 19/41865* (2013.01); *G05B 2219/32395* (2013.01)

(58) Field of Classification Search
CPC ................ G05B 19/41865; G05B 2219/32395
See application file for complete search history.

(56) References Cited

U.S. PATENT DOCUMENTS

| | | | | |
|---|---|---|---|---|
| 2010/0026102 | A1* | 2/2010 | Landgraf ........... | G05B 19/0428 307/116 |
| 2013/0145194 | A1 | 6/2013 | Kleiber | |
| 2016/0079756 | A1 | 3/2016 | Ikeyama et al. | |

(Continued)

FOREIGN PATENT DOCUMENTS

| | | |
|---|---|---|
| CN | 103069360 A | 4/2013 |
| CN | 107850879 A | 3/2018 |

(Continued)

OTHER PUBLICATIONS

European Patent Office, International Search Report for PCT/DE2022/100345, dated Jul. 26, 2022, 21 pages (including translation).

(Continued)

*Primary Examiner* — Michael W Choi
(74) *Attorney, Agent, or Firm* — Suiter Swantz IP

(57) ABSTRACT

A production machine (1) that has at least two different standby states is operated. Incoming and outgoing flows (ES, AS), comprising energy flows (EN) and material flows (ST), occur in each standby state, depending on the state. Each standby state has an associated base rating (BB1, BB2) that has a dependency on the period of time that elapses when changing from the respective standby state to the productive state of the machine (1). The base rating (BB1, BB2) is higher, the shorter said period of time is.

17 Claims, 3 Drawing Sheets

(56) References Cited

U.S. PATENT DOCUMENTS

| | | | | |
|---|---|---|---|---|
| 2016/0124416 | A1 * | 5/2016 | Besuchet ............. | G05B 19/042 700/173 |
| 2018/0330300 | A1 | 11/2018 | Runkana et al. | |
| 2019/0011893 | A1 * | 1/2019 | Müller ............... | G05B 19/0426 |
| 2021/0096541 | A1 | 4/2021 | Sayyarrodsari et al. | |

FOREIGN PATENT DOCUMENTS

| | | | | |
|---|---|---|---|---|
| CN | 111950767 | A | 11/2020 | |
| DE | 102006001257 | A1 | 7/2007 | |
| DE | 102009008033 | | 4/2010 | |
| DE | 102009017959 | A1 | 10/2010 | |
| DE | 102012206082 | A1 | 10/2013 | |
| DE | 102013111497 | A1 | 4/2014 | |
| DE | 102014219771 | A1 | 3/2016 | |
| DE | 102016119100 | A1 | 4/2017 | |
| DE | 102017000955 | A1 | 8/2017 | |
| DE | 102018101754 | A1 | 8/2019 | |
| DE | 112018007234 | T5 | 11/2020 | |
| EP | 1886199 | B1 | 1/2009 | |
| EP | 2522202 | B1 | 6/2014 | |
| WO | WO-2013/044962 | A1 * | 4/2013 | ............. G05B 15/02 |
| WO | 2017028931 | A1 | 2/2017 | |

OTHER PUBLICATIONS

China Patent Office, Office Action for Application No. CN202280039931.5 dated Mar. 16, 2026, 14 pages.

* cited by examiner

PRODUCTION INSTALLATION AND METHOD FOR OPERATING A PRODUCTION MACHINE

CROSS-REFERENCE TO RELATED APPLICATIONS

The present application is the U.S. National Phase of PCT Patent Application Number PCT/DE2022/100345, filed on May 5, 2022, which claims priority to German Patent Application Serial Number 10 2021 117 244.6, filed on Jul. 5, 2021, the entire disclosures of which are incorporated by reference herein.

FIELD OF INVENTION

The invention relates to a method for operating a production machine, wherein, apart from its productive state, the machine can assume at least one non-productive state, which is generally referred to as a standby state, and there exists both incoming flows entering the production machine and outgoing flows leaving the production machine, each of which is either continuous or discontinuous. The invention further relates to a production installation which comprises at least one production machine.

BACKGROUND

The CN 111950767 A discloses an analysis system which involves energy efficiency and accesses a database. The analysis system processes, among other things, operating and maintenance data. Real-time data acquisition is intended here. The result of the energy efficiency analysis can be shown on a display and should be consulted as a basis for decision-making by operating and maintenance personnel.

DE 10 2013 111 497 A1 discloses a clothing treatment device that indicates energy efficiency and is intended to enable the user to check energy efficiency in real time. The clothing treatment device described in DE 10 2013 111 497 A1 includes, among other things, a heat pump.

EP 1 886 199 B1 describes an operating method for an evaluation device for a production machine, in particular a machine tool. As part of this operating method, sensors capture the actual states of the production machine during the production of a product. The captured states are then compared with predefined state combinations, with which fulfilled state combinations should be determined. Further evaluations can follow. The recording times of the states are particularly important here. Ultimately, the aim is to obtain statistical information about the production machine.

EP 2 522 202 B1 discloses a production machine having an operating state warning light device. The production machine can also be a machine tool in this case. The operating state warning light device, which is adapted for visually displaying a plurality of different operating states, can have a warning light surface that is at least 1 square meter in size.

A method for operating a production machine described in DE 10 2018 101 754 A1 assumes that, in a first step, production progress and a machine state of the production machine are captured by means of a sensor. In further steps, data sets are created, whereby, among other things, evaluations are carried out regarding production progress, the order volume and available production capacities.

DE 10 2012 206 082 A1 proposes a method for assessing a state of an installation and for initiating measures. As part of this method, energy and/or media data is recorded over a reference period of predefined duration in order to determine reference values. In a subsequent step of the method, data is recorded over a comparison period, the duration of which can correspond to the duration of the reference period. If the values recorded in the comparison period deviate too much from the associated values of the reference period, predefined measures can be initiated.

DE 10 2009 008 033 B3 relates to supplying different types of energy to energy-related objects. DE 10 2009 008 033 B3 mentions heat, cold, compressed air and electricity in detail. The requirement for each type of energy is a proportion of the maximum energy/power that can be distributed and should be determined using a neural network. Here, objects are viewed as neurons that are provided with interfaces adapted to individual phases of life cycles.

SUMMARY OF THE INVENTION

The invention is based on the object of specifying a resource-saving method, which has been further developed with respect to the prior art, for operating a production machine, in the context of which switching between different states of the machine takes place, wherein both material and non-material flows entering the machine and flows leaving from the machine must be taken into account in the broadest sense.

This object is achieved according to the invention by a method for operating a production machine according to claim 1. The method can be implemented in a production machine that has at least two different standby states. Each standby state can be distinguished from the producing state of the machine. Incoming and outgoing flows, comprising energy flows and material flows, occur depending on the state in both the producing state and in every standby state.

Each possible standby state is associated with a base rating, which depends on the period of time that elapses when changing the machine from the standby state to the productive state. The shorter the specified period of time is, i.e. the faster the return from the standby state to the productive state can be achieved, the higher the base rating is. In addition, further factors can influence the base rating in individual cases.

Key figures are assigned for the different standby states for each flow, be it material or non-material, wherein the more similarities the relevant flow has with the corresponding flow occurring in the productive state, the higher the key figure is. Each key figure is associated with a so-called future factor, which is set to one in the case of a constant weighting of the corresponding flow, but can also assume values above or below one to anticipate deviating, higher or lower weightings in the future. The key figures are assigned in simple method variants by the users of the production machine. In more complex variants, automatic generation of key figures can be provided on the basis of information stored in databases which allows conclusions to be drawn about likely future developments.

The key figures weighted with the future factors are added for each standby state on the input side and output side to weighted key figures on the input side and output side. State-specific overall rating factors are formed therefrom. Time-dependent state ratings for the individual standby states are thereby calculated by subtracting the product of time and the overall rating factor from the base rating of the relevant standby state.

The next step is to automatically determine the time for which the state rating of a first standby state corresponds to the state rating of a second standby state. This determined time is—also automatically—compared with an intended duration, for example entered by the operating personnel, for which the production machine is to be taken out of the productive state. Finally, a signal for changing to the standby state which has the lower overall rating factor compared to the at least one further standby state included in the calculation is outputted if the intended duration in which the machine is to be used non-productively is longer than the determined time.

The production machine, which can be operated according to the present method, can be integrated into a more comprehensive production installation according to claim 9.

One of the standby states can be defined as ECO mode. Compared to other possible non-productive operating states, ECO mode lies between two extremes: A first extreme is the full, immediate operational readiness of the production machine; a second extreme is the fully switched-off state of the production machine. In any case, at least in one of the standby states to be compared with one each other, there are flows of some kind which flow into the production machine or leave the production machine. A higher level of readiness to resume productive operation of the machine is usually accompanied by higher consumption and/or emissions. Conversely, switching off or throttling flows in the standby state usually means a longer duration required to fully restart the production machine.

The proposed operating method not only weighs up the various competing goals, i.e. the most spontaneous, all-time operational readiness on the one hand and the greatest possible shutdown of flows outside of the productive state on the other hand, but also takes into account foreseeable or estimable future developments in the weighing-up process. This means that at the current point in time, which requires a decision about the operating state of the machine, a particularly high weighting can be given to criteria, of which the importance will only increase in the future.

The standby state to which to switch is automatically determined by the proposed operating method. Further steps can either be triggered automatically or by the operating personnel of the production machine. In any case, non-linear time-dependent influences can be included in the state ratings in addition to influences with a direct time dependency, for example the consumption of electrical energy. This may include, for example, risks that cannot be understood as a function of time and which may be associated with the stopping of material or energy flows. Likewise, with the help of such qualitative ratings, dependencies on at least one further installation linked to the production machine can be included in the state ratings in a generalized manner.

The operating method is in particular configured to compare more than two possible standby states with each other, wherein, after the production machine has resumed productive operation, comparisons are made between the forecast underlying the switch to the selected standby state and actual quantities influenced by the switch.

Based on a comparison between more than two possible standby states, it is possible to store a plurality of actual scenarios, which include a switch to a standby state and a resumption of productive operation, and to evaluate them with artificial intelligence means to further develop the standby states and the algorithms used during switches. The evaluation of the various scenarios optionally includes, among other things, the times at which the states of the production machine changed or are expected to change.

Regardless of any evaluations, switching to one of the possible standby states can trigger a blocking time during which switching in the opposite direction is blocked.

A production machine configured to carry out the operating method according to the application can carry out any production steps. For example, it can be a machine for processing metal workpieces, for example by machining with a defined or undefined cutting edge. The machine can also be provided for the forming or primary shaping of workpieces—including through 3D printing. Additionally or alternatively, assembly steps, for example, are carried out by the production machine. In all cases, the production machine can be part of a more comprehensive production installation.

In typical embodiments of the production machine, at least in one of the selectable standby states, there are flows which include an electrical current and a compressed air flow on the input side and an at least indirectly induced gaseous flow on the output side. Other possible flows include, for example, flows of cooling lubricant and exhaust gas flows of any composition. Noise emissions also constitute a flow that can play a role in the present operating method.

BRIEF DESCRIPTION OF THE DRAWINGS

In the following, an exemplary embodiment of the invention is explained in more detail with reference to a drawing. In the drawings.

DETAILED DESCRIPTION

Figure 1:
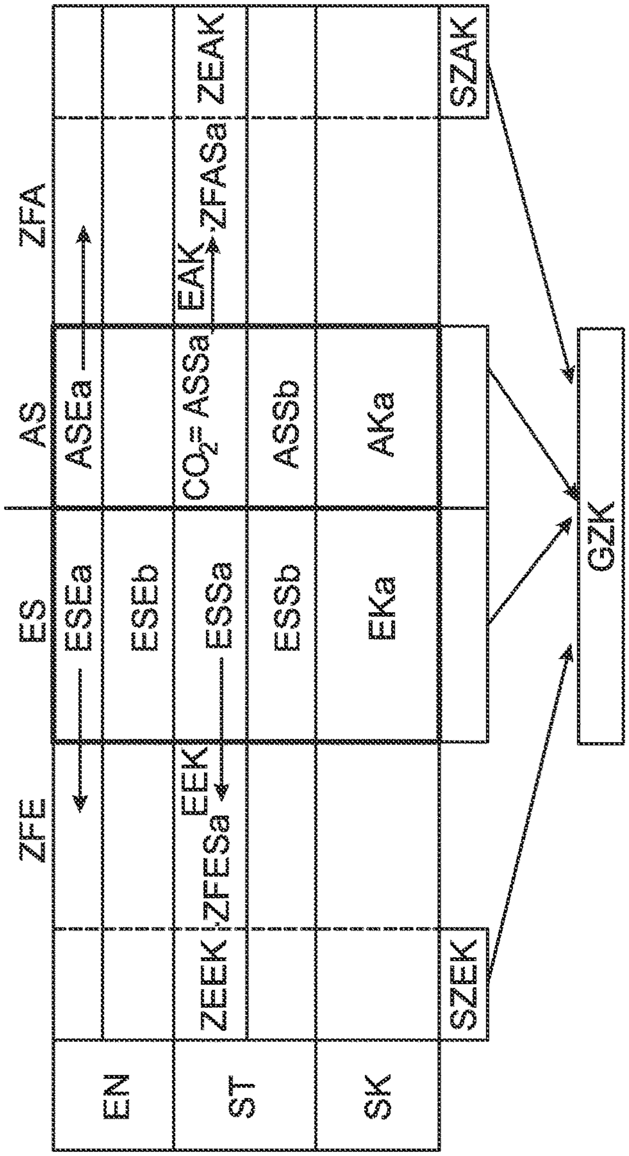
FIG. 1 shows features of a method for operating a production machine in a block diagram.

In the exemplary embodiment, a production machine marked overall with the reference sign 1 is a machine which is intended for grinding workpieces, with additional steps, including the handling of workpieces, optionally also being able to be carried out by the machine 1. A housing of the machine 1 is marked with 2 and a rotating machine element, that is, in the present case, a grinding wheel, with 3.

Input-side flows ES and output-side flows AS occur both during productive operation of the machine 1, i.e. here when grinding workpieces, and in non-productive phases. A distinction can be made between energy flows EN and material flows ST. Lines 4, 5 on the input side are used, among other things, to supply the machine 1 with liquid and gaseous media, in particular water, cooling lubricant and compressed air, wherein in the latter case there is an overlap between an energy feed and a media feed.

In general, input-side energy flows are referred to as ESEa, ESEb, etc. and input-side material flows are referred to as ESSa, ESSb, etc. An output-side energy flow ASEa can be in the form of a flow recovery. In particular, a $CO_2$ emission should be mentioned as the output-side material flow ASSa, although this does not necessarily have to mean that $CO_2$ is emitted directly by the machine 1. Rather, $CO_2$ emissions can also be attributed to the operation of the machine 1, which are indirectly induced by the operation of the machine 1. A further output-side material flow ASSb is, among other things, a wastewater flow, which can be discharged through an output-side line 7. Gaseous substances that are emitted by the machine 1 can be discharged through an output-side line 8.

The tabular diagram outlined in FIG. 1 is populated for various states, including standby states, of the machine 1. Here, each, not necessarily continuous, individual flow that acts on the machine 1 in some way or leaves the machine 1, that is to say all energy and material flows EN, ST, is associated with a key figure, which is to be interpreted as the size of a footprint that the machine 1 leaves behind in the state. Therefore, there are input-side key figures EEK and output-side key figures EAK for each input- and output-side flow ESEa, ASEa, ESEb, ESSa, ASSa, ESSb, ASSb.

As an example, the inflow of water and the emission of $CO_2$ can be seen in FIG. 1. For both resource consumption and emissions, it is assumed that the rating of the so-called footprints will change in the future, i.e. typically over a time horizon of years to decades. This circumstance is taken into account by defining individual input-side future factors ZFE and output-side future factors ZFA.

In the simplest case, i.e. if the rating is expected to remain the same, the corresponding factor ZFE, ZFA is set to one. If an increasing importance of resource consumption or an emission is assumed, the relevant value ZFE, ZFA is set to an amount above one. Theoretically, in the case of decreasing importance, future factors ZFE, ZFA below one are also possible.

In each case, the individual key figures EEK, EAK are multiplied by the associated individual future factors ZFESa, ZFASa, as a result of which weighted input-side key figures ZEEK and weighted output-side key figures ZEAK, individually for each flow ESEa, ASEa, etc., are obtained. The weighted key figures ZEEK, ZEAK are added over all input and output flows EN, ST. In addition, there are other criteria SK, which are expressed in the form of input-side and output-side key figures EKa, AKa and in particular reflect discontinuous influences. Such an influence can in particular be that the availability of an installation complex, which includes the machine 1 or is linked to the machine 1, depends on the selected standby state of the machine 1. Such relationships are also captured in a generalized numerical manner and are included in the totaled weighted input-side and output-side key figures SZEK, SZAK. From these key figures SZEK, SZAK, an overall rating factor GZK is finally formed by addition, wherein the calculation process can be shortened in cases in which the future factor ZFE, ZFA is one. In any case, each standby state of the machine 1 is associated with a separate overall rating factor GZK.

The overall rating factor GZK indicates how quickly a state rating of the machine 1 changes. This is based on base ratings BB1, BB2, which are associated with each selectable standby state. The more similar the relevant state is to the productive operation of machine 1, the higher the base rating BB1, BB2. In the present case, for example, the base rating BB1 for the "machine on" state is set to 100 and the base rating BB2 for the standby state, which is referred to as ECO mode, is set to 70.

Figure 2:
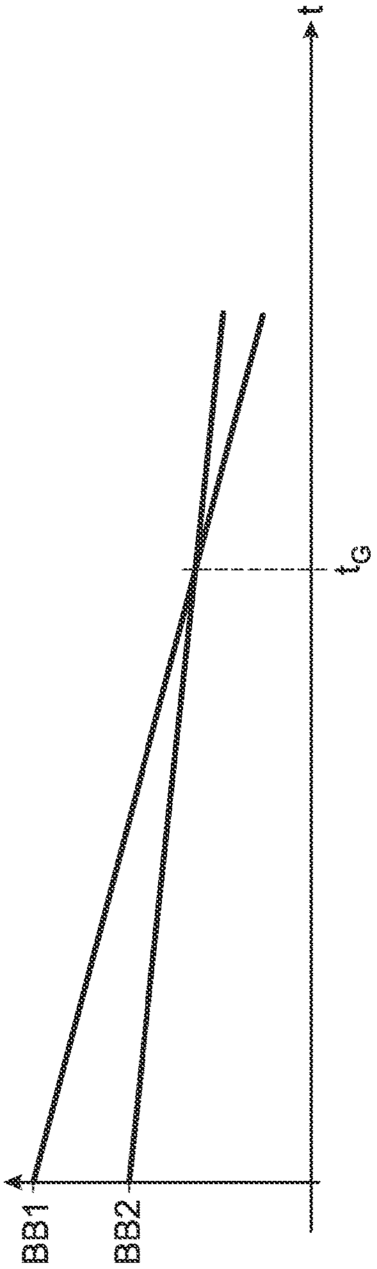
FIG. 2 shows possible changes over time in the states of the production machine in a diagram.

The state rating dependent on the time t is automatically calculated by subtracting the product of the associated overall rating factor GZK and the time t from the base rating BB1, as illustrated in FIG. 2. If the machine 1 remains in the "on" state, the high rating BB1 is assumed, which, however, drops quickly due to the high material and energy inflows as well as the emissions that inevitably occur. Conversely, in the case of the ECO mode, i.e. starting from the rating BB2, there is initially a lower rating level, but there is then a flatter drop in the rating. An evaluation unit 12, which can be integrated into the machine 1, determines at what limit time to a change is advantageous from the standby state, with which the base rating BB1 is associated, to the ECO mode, that is the state with the base rating BB2. In practice, the time to is, for example, five, ten or fifteen minutes or more.

On the machine 1, there is a display field referred to as the ECO mode field 9, which displays in plain text whether the ECO mode is activated. Optionally, the €CO mode field 9 is integrated into a display device 11 of the machine 1. The display device 11 can be used, among other things, to display the operating hours attributable to the ECO mode as well as the total number of operating hours. It can also be displayed whether automatic activation of the ECO mode is intended in the current state. Control elements of the machine 1, including switches and buttons, are designated 10. The display device 11 can also fulfill the function of control elements in a manner known per se. In order to be able to recognize particularly quickly and easily whether the €CO mode is activated, the corresponding field 9 has a color coding. Here, for example, "green" means that the ECO mode is switched off and the machine is in the "on" state, i.e. in the practically immediately operational state, with which base rating BB1 is associated. However, if the ECO mode field 9 appears in the color "orange", this means that the production machine 1 is in ECO mode. The ECO mode field 9 can be designed as a button with which the ECO mode can be activated or deactivated, provided that the necessary requirements are met and no automatic switching is carried out by the evaluation unit 12.

Figure 3:
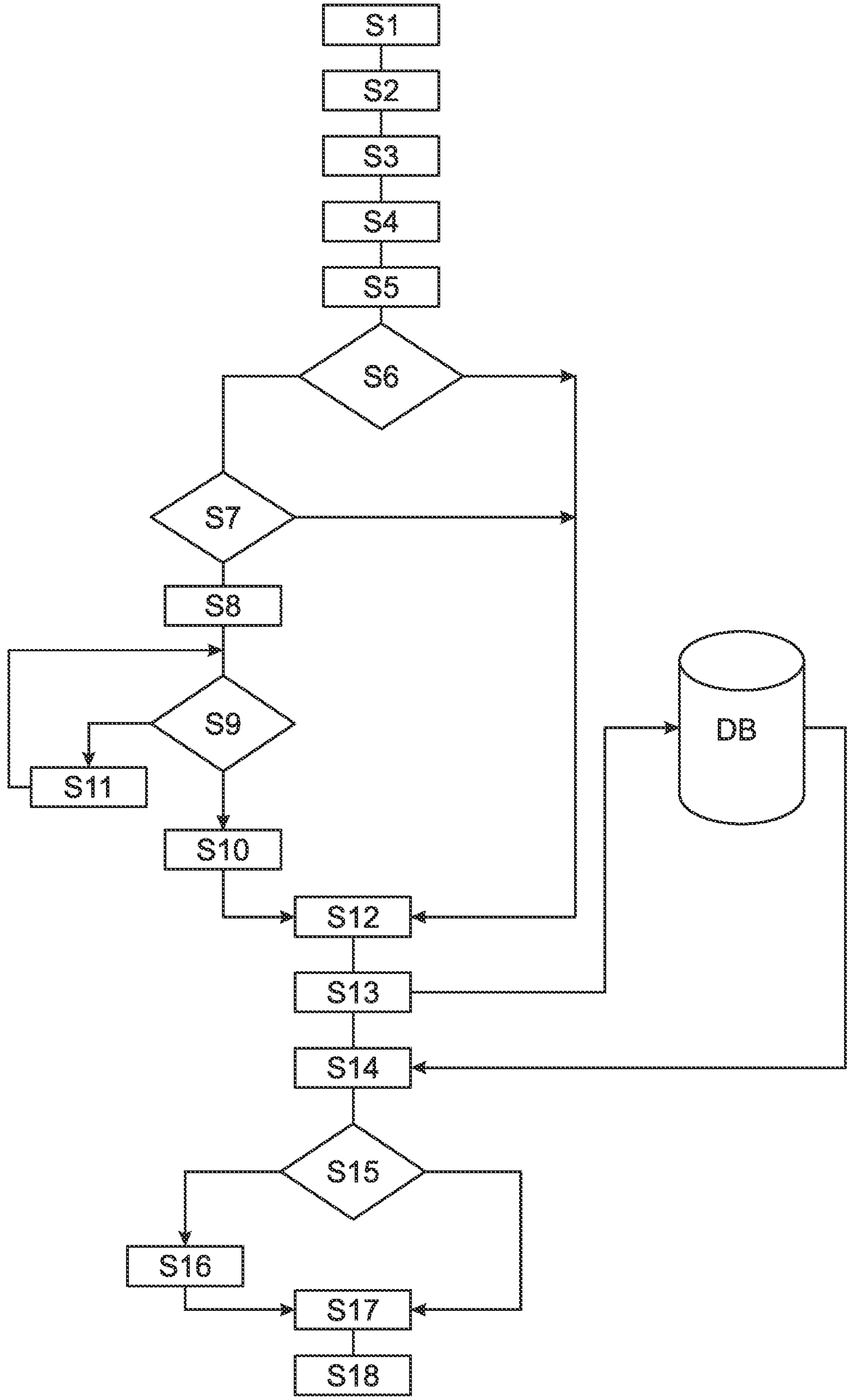
FIG. 3 shows the method for operating the production machine in a flowchart.
Figure 4:
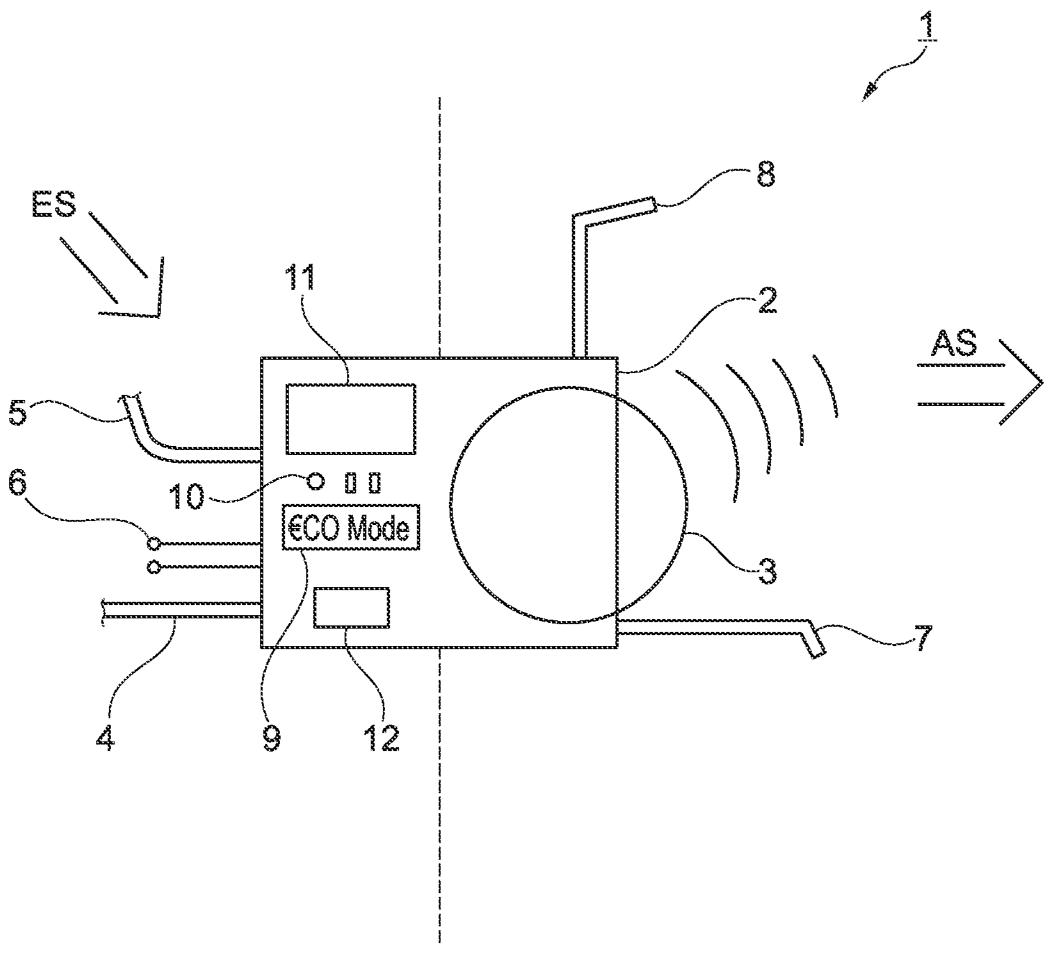
FIG. 4 shows the production machine in a symbolized representation.

To explain the operating method which includes at least one operating phase in the ECO mode, reference is made below to the flowchart according to FIG. 3. In the first step S1, the base rating BB1 for the first standby state is determined. In the second step S2, the corresponding determination is made for the second standby state, that is, in the present case, for the ECO mode. Step S3 means the determination of the overall rating factor GZK for the first standby state, step S4 means the corresponding determination for the second standby state. In step S5, the time to is calculated in the manner described, which is defined by the matching state ratings, that is the intersection of the characteristic curves shown in FIG. 2.

In step S6, a comparison is made as to whether an expected downtime of the machine 1 is greater or less than the calculated limit time to. If the calculated time to is expected to be exceeded, the next step S7 checks whether further requirements for changing the standby state are met. In particular, the requirement is that a change to €CO mode is not blocked by the operating personnel. If the necessary requirements are met, the standby state is changed in step S8, i.e. the ECO mode is activated. Depending on the settings selected, this can also be done automatically, in which case the time until the ECO mode is automatically activated is displayed.

If a reset to the previous state is desired, step S9 checks whether a required waiting time, during which the ECO mode must be maintained, has already expired. The waiting time, which is also referred to as the remaining time of the ECO mode, is displayed to the operating personnel. If the waiting time has not yet expired, only the corresponding change request entered by the user is captured in step S11 and there is otherwise a return to the query, i.e. step S9. If all the requirements for canceling the ECO mode are met, the previous state of the machine 1 is restored in step S10 and operation is continued in step S12, as is the case if it is determined in step S6 that no exceedance of the time to is to be expected.

In step S13, data recorded during operation of the production machine 1 including the ECO mode are transmitted to a database DB, wherein a data transfer can also take place at any other time. Data from the database DB is transmitted in step S14. In the following step S15, the data obtained in the current case is compared with stored information that relates to processes that have already expired and been evaluated. The result of this evaluation, which includes artificial intelligence means, may be that settings of the ECO mode need to be changed, which happens in step S16. Even without any changes to the ECO mode, data is returned to the database DB in step S17, which enables the algorithms used to select and further develop the best standby state to be successively optimized. The completion of the method is referred to as step S18.

LIST OF REFERENCE SIGNS

1 Machine, installation
2 Housing
3 Rotating machine element
4 Line, input side
5 Line, input side
6 Electrical line
7 Line, output side
8 Line, output side
9 €CO mode field
10 Control element
11 Display device
12 Evaluation unit
AKa Key figure, output side
AS Output-side flow
ASEa Output-side energy flow
ASSa Output-side material flow
ASSb Output side material flow
BB1 Base rating
BB1 Base rating
DB Database
EAK Output-side key figure
EEK Input-side key figure
EKa Key figure, input side
EN Energy flow
ES Input-side flow
ESEa Input-side energy flow
ESEb Input-side energy flow
ESSa Input-side material flow
ESSb Input-side material flow
GZK Overall rating factor
SK Other criterion
ST Material flow
SZEK Totaled key figure, input side
SZAK Totaled key figure, output side
S1 . . . S18 Method step
t Time
$t_G$ Limit time
ZFE Future factor, input side
ZFA Future factor, output side
ZFESa Future factor, individual, input side
ZFASa Future factor, individual, output side
ZEEK Key figure, input side, weighted
ZEAK Key figure, output side, weighted

The invention claimed is:

1. A method for operating a production machine, which has at least two different standby states and a productive state, an incoming flow and an outgoing flow occur in each of the at least two different standby states, the method comprising:

assigning key figures for the at least two different standby states for each of the incoming flow and the outgoing flow, the key figures are assigned higher the more similarities the incoming flow or the outgoing flow have with a flow that occurs in the productive state;

associating future factors with each of the key figures, the future factors are one in the case of no anticipated deviation of a corresponding flow in the future or are larger or smaller than one in the case of anticipated deviation of the corresponding flow;

weighting the key figures with the future factors to form weighted key figures;

adding the weighted key figures of the incoming flow and the outgoing flow to form overall rating factors of the at least two different standby states;

calculating time-dependent state ratings for the at least two different standby states by subtracting the product of time (t) and the overall rating factors from base ratings of the at least two different standby states, the base ratings have a dependency on periods of time that elapse when changing from the at least two different standby states to the productive state, the base ratings are higher the shorter the periods of time are:

determining a determined time for which a first time-dependent state rating of the time-dependent state ratings of a first standby state of the at least two different standby states corresponds to a second time-dependent state rating of the time-dependent state ratings of a second standby state of the at least two different standby states;

comparing the determined time with an intended duration, for which the production machine is to be taken out of the productive state; and outputting an output signal for changing to a specific standby state of the at least two different standby states which has a lowest overall rating factor of the overall rating factors based on the comparing, wherein the production machine is automatically set to the specific standby state with the lowest overall rating factor by the output signal.

2. The method according to claim 1, wherein the output signal for changing to the specific standby state is outputted in a form that can be recognized by an operator of the production machine without automatic switching.

3. The method according to claim 1, wherein the time-dependent state ratings additionally include non-linear time-dependent influences in the form of the key figures, which include dependencies on at least one further installation linked to the production machine.

4. The method according to claim 1, wherein more than two possible standby states are compared with one another, wherein, after the production machine has resumed productive operation, comparisons are made between a forecast underlying a switch to the specific standby state and actual quantities influenced by the switch.

5. The method according to claim 4, wherein a plurality of actual scenarios, which include a switch to a standby state of the at least two different standby states and a resumption of productive operation of the production machine in the productive state, are stored and evaluated with artificial intelligence to further develop the at least two different standby states and algorithms used during the switch.

6. The method according to claim 5, wherein the times at which the states of the production machine are changed are included in the evaluation of the plurality of actual scenarios.

7. The method according to claim 1, wherein switching to one of the at least two different standby states triggers a blocking time, during which switching to the productive state is blocked.

8. A production installation, comprising at least one production machine configured to carry out the method according to claim 1, wherein at least in one of the at least two different standby states a total of at least three different flows (ES, AS) exist on an input side and an output side, which comprise material flows and energy flows.

9. The production installation according to claim 8, wherein there are flows which are present both during productive operation and in at least one standby state of the at least two different standby states of the production machine, which comprise an electrical current and a compressed air flow on the input side and an at least indirectly induced gaseous flow on the output side.

10. A method for operating a production machine having at least two different standby states and a productive state, the method comprising:

assigning key figures for the at least two different standby states for each of an incoming flow and an outgoing flow of the production machine, the key figures are assigned higher the more similarities the incoming flow or the outgoing flow has with a flow that occurs in the productive state;

associating future factors with each of the key figures and weighting the key figures with the future factors to form weighted key figures, wherein a respective of the future factors is one in the case of no anticipated deviation of a corresponding flow in the future or is larger or smaller than one in the case of anticipated deviation of the corresponding flow;

adding the weighted key figures of the incoming flow and the outgoing flow to form overall rating factors of the at least two different standby states;

calculating time-dependent state ratings for the at least two different standby states by subtracting the product of time (t) and the overall rating factors from base ratings of the at least two different standby states;

determining a determined time for which a first time-dependent state rating of the time-dependent state ratings of a first standby state of the at least two different standby states corresponds to a second time-dependent state rating of the time-dependent state ratings of a second standby state of the at least two different standby states;

comparing the determined time with an intended duration, for which the production machine is to be taken out of the productive state; and outputting an output signal for changing to a specific standby state of the at least two different standby states which has a lowest overall rating factor of the overall rating factors based on the comparing, wherein the production machine is automatically set to the specific standby state with the lowest overall rating factor by the output signal.

11. The method according to claim 10, wherein the output signal for changing to the specific standby state is outputted to a display device.

12. The method of claim 10, wherein the production machine comprises a rotating machine element.

13. A production machine having at least two different standby states and a productive state, the production machine comprising:

a housing;

a rotating machine element;

one or more input lines configured to provide at least one of liquid or gas to the production machine; and one or more output lines configured to discharge at least one of a waste liquid or a waste gas;

wherein the production machine is configured to:

assign key figures for the at least two different standby states for each of an incoming flow and an outgoing flow of the production machine, wherein the key figures are assigned higher the more similarities the incoming flow or the outgoing flow has with a flow that occurs in the productive state;

associate future factors with each of the key figures and weighting the key figures with the future factors to form weighted key figures, wherein a respective of the future factors is one in the case of no anticipated deviation of a corresponding flow in the future or is larger or smaller than one in the case of anticipated deviation of the corresponding flow;

add the weighted key figures of the incoming flow and the outgoing flow to form overall rating factors of the at least two different standby states;

calculate time-dependent state ratings for the at least two different standby states by subtracting the product of time (t) and the overall rating factors from base ratings of the at least two different standby states;

determine a determined time for which a first time-dependent state rating of the time-dependent state ratings of a first standby state of the at least two different standby states corresponds to a second time-dependent state rating of the time-dependent state ratings of a second standby state of the at least two different standby states;

compare the determined time with an intended duration, for which the production machine is to be taken out of the productive state; and output an output signal for changing to a specific standby state of the at least two different standby states which has a lowest overall rating factor of the overall rating factors if the intended duration is longer than the determined time, wherein the output signal automatically sets the production machine to the specific standby state with the lowest overall rating factor.

14. The production machine of claim 13, wherein the output signal for changing to the specific standby state is outputted to a display device.

15. The production machine of claim 13, wherein the rotating machine element comprises a grinding wheel.

16. The production machine of claim 13, wherein the at least one of liquid or gas provided by the one or more input lines comprise at least one of water, cooling lubricant, or compressed air.

17. The production machine of claim 13, wherein the at least one of liquid or gas discharged by the one or more output lines comprise at least one of waste water or $CO_2$.

* * * * *